Oct. 15, 1957 H. H. MUELLER 2,809,842

TONE ARM NEEDLE ASSEMBLY FOR AUTOMATIC INTERLOCKING DUAL PHONOGRAPH RECORD PLAYER

Original Filed July 1, 1952

Herman H. Mueller
INVENTOR.

BY Clarence A. O'Brien and Harvey B. Jacobson
Attorneys 2,809,842
Patented Oct. 15, 1957

2,809,842

TONE ARM NEEDLE ASSEMBLY FOR AUTOMATIC INTERLOCKING DUAL PHONOGRAPH RECORD PLAYER

Herman H. Mueller, Ephrata, Pa.

Original application July 1, 1952, Serial No. 296,558. Divided and this application May 25, 1956, Serial No. 591,776

10 Claims. (Cl. 274—36)

This invention comprises novel and useful improvements in a tone arm and control mechanism for automatic interlocking dual phonograph record players and comprises a continuation-in-part of my prior application Serial No. 98,048, filed June 9, 1949, for Automatic Interlocking Dual Phonograph Record Player and which has now matured into Patent No. 2,729,455, of January 3, 1956.

The primary object is to provide a tone arm construction having an improved stylus assembly adapted for playing successively both the top and bottom surfaces of records in the horizontal position and of records of either the conventional or the microgroove type.

Other important objects are to provide a tone arm stylus assembly wherein a plurality of needles and sets of needles may be securely held and whereby a selected needle or set of needles especially adapted for playing a particular type of record may be readily appropriately positioned both above and below a tone arm for playing such record.

These, together with various ancillary features and objects of the invention, which will later become apparent as the following description proceeds, are attained by the present invention, a preferred embodiment of which has been illustrated, by way of example only, in the accompanying drawings, wherein.

Figure 2:
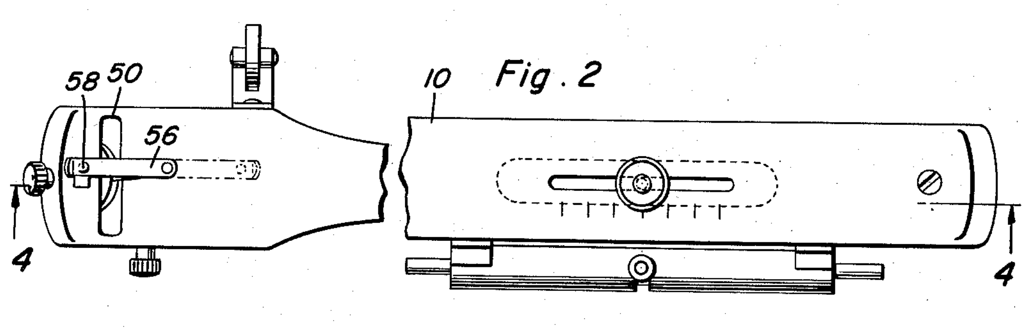
Figure 2 is a top plan view, parts being broken away, of the tone arm.

The tone arm 10 for which the stylus assembly disclosed and claimed herein is particularly adapted, is disclosed in my above identified patent and is set forth and claimed in my co-pending application Serial No. 296,558, of which this is a divisional application. Briefly, the tone arm is provided with a vibration transmission block or crystal cartridge 12, see especially Figures 2–4, which is secured in the head of the tone arm in any suitable manner, and has conductors 14 connected thereto and associated in a conventional manner with any type of amplifying unit of sound waves or reproducing or transcribing unit of sound waves on record disks (not shown).

Figure 3:
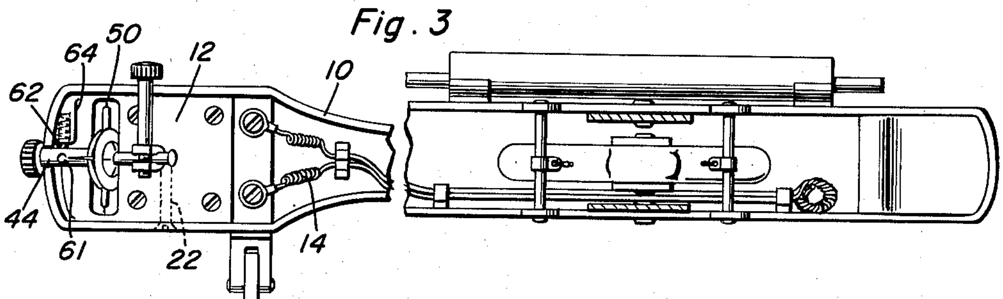
Figure 3 is a longitudinal horizontal sectional view of the tone arm taken substantially upon the plane indicated by the section line 3—3 of Figure 4, parts being broken away; and, Figure 4 is a vertical longitudinal sectional view of the tone arm taken substantially upon the plane indicated by the section line 4—4 of Figure 2, parts being broken away.
Figure 4:
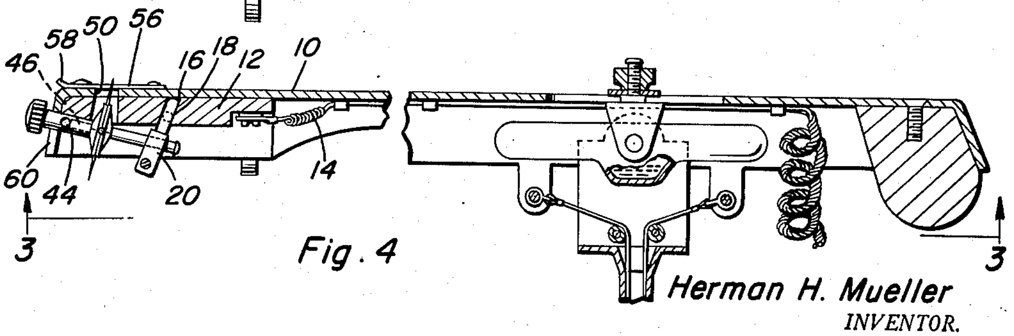

A vertical, or upwardly inclined bore 16 is formed in the block 12, extending upwardly from its lower surface, and the stem 18 of a metal pin having a bifurcated end 20 is held in this bore by a set screw 22 (see Figures 3 and 4).

Figure 1:
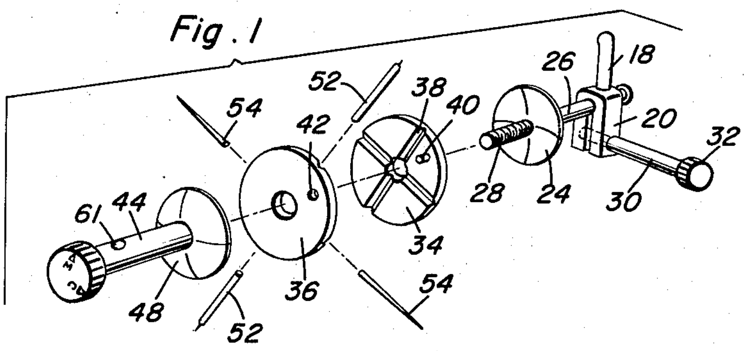
Figure 1 is an exploded perspective view of the stylus or needle supporting means.

Referring now more specifically to Figure 1, which shows the stylus assembly, it will be apparent that a stop plate 24 is formed on a pin 26 one extremity of this pin being externally threaded as at 28. The other end of the pin 26 is clamped adjustably in the bifurcated portion 20 by a clamping screw 30 having a knob 32. A pair of complementary circular plates 34 and 36, centrally apertured for mounting upon the extension 28, are provided for holding the needles or stylus. These plates are formed on their adjacent surfaces with equidistant, radially extending slots 38 within which the inner ends of the needles are received and clamped. A lug 40 projects outwardly from the plate 34 and is adapted to be received in an opening 42 in the plate 36 to thus align or cause registration of the complementary grooves for retaining the needles therein, when the plates are disposed on the threaded end 28 of the pin 26.

A locking member 44 is formed at its inner end with an internally threaded socket 46, indicated by dotted lines in Figure 4, to receive the end 38 and a stop plate 48 is integrally formed on the member to abut against the outer surface of the plate 36. The member 44 is disposed through the front of the head of the tone arm, as seen in Figure 4.

A transverse slot or opening 50 is formed in the tone arm to allow one of the needles to extend upwardly and rearwardly therethrough. It is to be noted that a pair of micro-needles 52 are disposed in alignment in the grooves 38 and a pair of conventional needles 54 are disposed in alignment in the interposing grooves. Thus the needles extend in a diagonal, or vertically inclined plane above and below the tone arm, so that the downwardly extending needle may contact the top surface of a record disposed on a turntable, while the upwardly extending needle contacts the sound track of the underside of a record disposed on the connecting records. Upon rotation of the needle holder through 90°, a different set of needles is positioned which is adapted for coaction with a different type of sound groove. It is to be noted that the record whose undersurface is being played by the upwardly projecting needle travels in a reverse direction to the rotative path of the record upon the driving turntable, so that the upper needle extends rearwardly while the lower needle extends forwardly. An arm 56 is pivotally carried by the top of the tone arm head and is adapted to swing across the slot 50 and to a locking detent construction 58, as shown in full lines in Figure 2, so as to align the upwardly extending needle in a proper and vertical position. After such alignment, the arm 56 is returned to its normal idle position as shown in dotted lines.

As shown in Figures 3 and 4, the spindle 44 of the locking member extends through a vertically disposed slot 60 in the end wall of the tone arm whereby the finger-grip portion or knob is positioned for convenient rotation of the clamping plates 34 and 36 of the needle support. The stem is provided with appropriately placed locking recesses 61, one recess being provided for each pair of needles, the recesses being positioned for engagement by a spring loaded detent 62 slidable in a recessed lug 64 on the tone arm. The detent engages a recess to yieldingly retain the spindle 44 in calibrated position to cause the pair of needles, corresponding to indicia on the knob, to be appropriately positioned for engaging the upper and under surfaces of records for playing the same.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be restored to, falling within the scope of the appended claims.

Having described the invention, what is claimed as new is:

1. A tone arm assembly for phonograph record players of the type adapted to selectively play the top and bottom sides of records mounted for rotation about a vertical axis comprising; a tone arm operatively mounted at one end upon a record player and having a vertical opening therethrough at the other end, a needle support, a pair of diametrically oppositely disposed needles mounted upon said needle support, a pick up member supported by said tone arm upon the underside thereof and operatively connected to said needles, means mounting said needle support upon said pick up member and rotatably journaling said needle support for rotation about an axis which lies in a vertical plane and is inclined to the longitudinal axis of said tone arm, said needle supporting being housed within the lower portion of said tone arm and being positioned whereby one of said pair of needles may be projected upwardly through said opening and the other needle may be projected downwardly below said tone arm whereby they may be respectively engaged with the bottom and top sides of records, said opening being of sufficient extent transversely of said tone arm to permit successive passage of needles therethrough upon rotation of said needle support.

2. The combination of claim 1, including a needle positioning means pivoted to said tone arm for transverse swinging movement across said opening and positionable to engage a needle and thereby limit movement of a needle transversely of said opening whereby to accurately position in playing position a needle projecting upwardly through said opening and a needle projecting downwardly below said tone arm.

3. The combination of claim 1, wherein said means for journaling said support includes resilient means yieldingly retaining said needle support in rotationally adjusted position.

4. A tone arm assembly for phonograph record players of the type adapted to selectively play the top and bottom sides of records mounted for rotation about a vertical axis, comprising; a tone arm operatively mounted at one end upon a record player and having at the other end thereof a needle support, a plurality of needles mounted upon said support, a pick up member supported by said tone arm upon the underside thereof and operatively connected to said needles, a shaft inclined in a vertical plane to the longitudinal axis of said tone arm and carrying thereon said needle support, said pick up member having upon its undersurface a bore inclined in a vertical plane to said longitudinal axis, said shaft having a bracket mounted on an end portion thereof, said bracket having a stem received in said bore for supporting said shaft, a lock member engaging said shaft, clamping means on said shaft and lock member for securing said needle support therebetween.

5. The combination of claim 4 wherein said tone arm has an opening in its end, said lock member extending through said opening for manual adjustment.

6. The combination of claim 4 wherein said bracket has at one end a bifurcated portion receiving an end of said shaft and at the other end has said stem, means engaging said bifurcated portion for clamping the same upon said shaft end.

7. The combination of claim 4 wherein said needle support includes a pair of plates having upon adjacent surfaces thereof complementary needle receiving grooves, said clamping means including collars on said shaft and lock member clamping said plates therebetween.

8. The combination of claim 4 wherein said needle support includes a pair of plates having upon adjacent surfaces thereof complementary needle receiving grooves, said clamping means including collars on said shaft and lock member clamping said plates therebetween, said shaft and lock members having axially aligned screw threadedly engaged sections.

9. The combination of claim 1 wherein said needle support has a plurality of pairs of oppositely directed needles mounted thereon, each pair of said pairs of needles being adapted to play different types of records whereby upon successive partial rotation of said support successive pairs of needles will be projected upwardly through the slot above the tone arm and projected downwardly therebeneath into operative playing position.

10. The combination of claim 1 wherein said needles project radially from the axis of rotation of said needle support and are oppositely inclined from a transverse plane perpendicular to the axis of the tone arm whereby to be rearwardly inclined relative to the direction of rotation of the sound track of the record with which they are adapted to engage.

References Cited in the file of this patent

UNITED STATES PATENTS

| | | |
|---|---|---|
| 989,544 | Graft | Apr. 11, 1911 |
| 2,572,712 | Fisher | Oct. 23, 1951 |
| 2,601,126 | Palo et al. | June 17, 1952 |
| 2,617,895 | Angle et al. | Nov. 11, 1952 |